US011900773B2

(12) United States Patent
Scarso et al.

(10) Patent No.: US 11,900,773 B2
(45) Date of Patent: Feb. 13, 2024

(54) ALARMED CLOSABLE PACKAGING FOR PALLETS

(71) Applicant: VA-CO PLAST—S.A.S.—DI SCARSO VALTER & C., Prato (IT)

(72) Inventors: Valter Scarso, Prato (IT); William Scarso, Prato (IT); Giacomo Scarso, Prato (IT)

(73) Assignee: VA-CO PLAST—S.A.S.—DI SCARSO VALTER & C., Prato (IT)

( * ) Notice: Subject to any disclaimer, the term of this patent is extended or adjusted under 35 U.S.C. 154(b) by 0 days.

(21) Appl. No.: 17/922,337

(22) PCT Filed: Apr. 8, 2021

(86) PCT No.: PCT/EP2021/059155
§ 371 (c)(1),
(2) Date: Oct. 28, 2022

(87) PCT Pub. No.: WO2021/219336
PCT Pub. Date: Nov. 4, 2021

(65) Prior Publication Data

US 2023/0215252 A1 Jul. 6, 2023

(30) Foreign Application Priority Data

Apr. 28, 2020 (IT) ........................ 102020000009250

(51) Int. Cl.
*G08B 13/14* (2006.01)
*B65D 55/02* (2006.01)

(52) U.S. Cl.
CPC ........... *G08B 13/14* (2013.01); *B65D 55/028* (2013.01); *B65D 2211/00* (2013.01); *B65D 2401/00* (2020.05)

(58) Field of Classification Search
CPC ... G08G 13/14; B65D 55/028; B65D 2401/00
See application file for complete search history.

(56) References Cited

U.S. PATENT DOCUMENTS 6,499,241 B1 * 12/2002 Vila-Martinez ........ B65D 55/06 40/312
6,864,791 B1 * 3/2005 Kam .................. G08B 21/0297 340/522

(Continued)

FOREIGN PATENT DOCUMENTS

| | | |
|---|---|---|
| WO | 2008/043955 | 4/2008 |
| WO | 2009/080317 | 7/2009 |
| WO | 2019/102198 | 5/2019 |

OTHER PUBLICATIONS

International Search Report for PCT/EP2021/059155 dated Sep. 6, 2021, 7 pages.

(Continued)

*Primary Examiner* — Hoi C Lau
(74) *Attorney, Agent, or Firm* — BROWDY AND NEIMARK, P.L.L.C.

(57) ABSTRACT

An alarmed closable packaging for a container of goods has at least two sections whose edges have closure elements and which, once in contact, completely envelop and seal the container of goods. The multilayer sections have first and second electrically conductive layers with an insulator between. The insulator recovers its thickness after having undergone crushing. Each section has a support with conductive attachments connected to respective conductive layers. Each section has an electronic device attached by the support, an electrode of the electronic device contacting conductive attachments of the support, creating a low continuous voltage on the first electrically conductive layer of each section, with another electrode similarly connected to the second electrically conductive layer. The electronic device transmits a signal to a receiver and records variation of the voltage from impacts or tears of the closable packaging or to an unauthorised removal of the device from its support.

18 Claims, 14 Drawing Sheets

(56) References Cited

U.S. PATENT DOCUMENTS 7,119,684 B2 * 10/2006 Petersen .......... G06K 19/07798 340/568.1
7,812,726 B2 * 10/2010 Barlow, Jr. .......... G08B 13/126 340/572.1
7,950,584 B2 * 5/2011 Simske ................ B42D 25/333 235/491
9,959,496 B2 * 5/2018 Camper .................. B32B 27/08
10,140,570 B2 * 11/2018 Gulas ................... G08B 13/126
10,258,131 B2 * 4/2019 Yim ..................... A45C 13/185
10,618,712 B2 * 4/2020 Goretti ................... B65D 55/06
11,013,095 B2 * 5/2021 Melo ........................ H05C 1/06
11,164,433 B2 * 11/2021 Zhang ................ G08B 13/2434
11,295,597 B2 * 4/2022 Walsh .................. G08B 21/185
11,412,876 B1 * 8/2022 Kadlub .................. A47G 29/20
2003/0065363 A1 * 4/2003 Faller ................... A61N 1/3904 607/5
2005/0225445 A1 * 10/2005 Petersen .............. B65D 55/028 340/568.2
2005/0242950 A1 * 11/2005 Lindsay ............. G06K 19/0723 340/572.1
2005/0242957 A1 * 11/2005 Lindsay ............. G06K 19/0716 343/893
2006/0208045 A1 * 9/2006 Chandaria ............ B65D 5/0236 229/102
2007/0029385 A1 * 2/2007 Kovac ................ G06K 19/0776 340/572.7
2007/0152829 A1 * 7/2007 Lindsay ........... G06K 19/07345 340/10.2
2008/0075934 A1 * 3/2008 Barlow .................. B65D 75/00 428/199
2008/0099565 A1 * 5/2008 Simske ................ B42D 25/333 235/487
2009/0289798 A1 * 11/2009 Yang .................. G08B 13/2448 340/572.8
2012/0187003 A1 * 7/2012 Stewart ................ G08B 13/126 340/654
2017/0068881 A1 * 3/2017 Camper .................. B32B 15/20
2017/0116830 A1 * 4/2017 Isaacs .................. G08B 13/128
2018/0148241 A1 * 5/2018 Gulas ...................... B32B 27/36
2019/0269268 A1 * 9/2019 Blubaugh ............ G08B 13/126
2019/0352066 A1 * 11/2019 Goretti ................. B65D 5/5405
2021/0174656 A1 * 6/2021 Zhang .................... B65D 55/06

OTHER PUBLICATIONS

Written Opinion of the ISA for PCT/EP2021/059155 dated Sep. 6, 2021, 11 pages.

* cited by examiner

ALARMED CLOSABLE PACKAGING FOR PALLETS

CROSS-REFERENCE TO RELATED APPLICATIONS

This application is the U.S. national phase of International Application No. PCT/EP2021/059155 filed Apr. 8, 2021 which designated the U.S. and claims priority to IT Patent Application No. 102020000009250 filed Apr. 28, 2020, the entire contents of each of which are hereby incorporated by reference.

BACKGROUND OF THE INVENTION

Field of the Invention

The present invention relates to a packaging for containers intended for the safe transport of goods. More particularly, the present invention relates to a packaging for pallets equipped with an alarm system capable of reporting and locating break-in attempts, even repeated ones, which may occur during the transport of the goods.

Description of the Related Art

As is known, various products may travel for short or long periods before arriving at the site of use by the end user or at the retail outlet. The goods, placed in special containers or pallets, may travel on often long, repeated routes with several delivery stages. During these phases, the goods cannot be constantly checked.

In general, goods that are transported daily by logistics firms are subject to constant attempts at theft during their movement within the transport chain before reaching their final destination. These attempts at thefts involve in particular the fashion, pharmaceutical and technology sectors, and in general any other type of medium to high-value goods.

Thefts lead not only to financial loss due to the removal of goods, but also have impact from the commercial standpoint, both from the point of view of the party commissioning the transport who has to deal with the lack of availability of the product with the end retailer, and from the point of view of the transporter who sees his customers' trust eroded.

In addition to constantly securing the cargo entrusted thereto, the logistics operator has great difficulties in identifying the step in the transport chain in which the pallet has been tampered with and, if necessary, in trying to recover the stolen goods in time and consequently identifying the perpetrator.

In the current state of the art there are a number of solutions for securing transported goods, the most effective of which consists of a packaging in which to wrap the pallet. The packaging is presented as a sort of bag made of woven raffia in flexible polypropylene (PLP) to which an outer polyethylene (PE) film is applied, thus forming a single layer.

The bag is composed of two distinct parts, a hood and a base, joined by two zips placed on their perimeter. The raffia material of which it is composed makes the packaging resistant to mechanical traction, just as the PE prevents the infiltration of liquids. In addition, a numbered security seal can be applied on the zip sliders to ensure the effective closure of the pallet. In the production phase, the bag is presented in panels to be assembled by seaming using an overlock method to form the two parts (hood and base) to which the two zips are subsequently applied around the entire perimeter.

Such a packaging makes it possible to check only visually whether there has been an attempt to break in. In fact, once applied to the pallet, it envelops it completely and the only way to reach the goods consists of damaging it or damaging the numbered seal closing the zip, thus making the break-in attempt visible.

In the frequent case of transport involving several delivery passages, in order for this solution to be effective, i.e. allowing the detection of whether a break-in attempt has occurred during the passage of the transport chain, it requires a visual check by the operator who ensures and ascertains the intactness thereof. This step requires the operator to carefully check each part of the pallet covering.

However, in some cases, defects of intactness of packagings go unreported due to camouflaging of the same, lack of attention from the inspectors or, in some cases, complicity in concealing tampering. In this way, it is not possible to trace back to the point or to the passage in the logistics chain in which an attempted unauthorised access to the contents of the pallet may have taken place, which is only ascertained at its final opening. In addition, it is not possible to identify whether other break-ins have been carried out since the initial one, in that the packaging is permanently compromised after the first break-in.

It should also be noted that known solutions have a low heat reflection specification and low UV rays screening. Furthermore, the fine thickness of the covering material is not suitable for dampening external impacts and the seams applied to join the modules that make up the base and the hood may sometimes be ineffective in retaining water on the outside, as is necessary in the case of exposure of the pallet to heavy and constant rain.

US2019/0269268A1 describes a system for securing a package comprising a tear-resistant bag. In some embodiments it is provided with an alarm system in which the bag comprises a first and second electrically conductive plate between which a layer of tear-resistant material is placed. When the bag is torn with an electrically conductive tool, such as a knife or a screwdriver, electrical contact is made between the conductive plates, which causes the alarm system to emit a sound signal through a loudspeaker.

This system also provides, to ensure the security of the contents, for the use of an anchoring means to attach the bag to a substrate, generally a rigid panel of wood, stone or concrete, and is therefore suitable for the transport of packages substantially reduced in size. Given its structure and its composition, it is not possible to extend application thereof also to containers of the size of goods transport pallets.

WO2008/043955A2 describes a protection sheet, generally intended for vehicles, formed by a multilayer material comprising two layers of electrically conductive material separated by an insulating layer. Such a sheet is made to be used to cover vehicles such as cars and also includes means for detecting tears by means of an electrically conductive tool connected to an alarm control system for transmitting a warning signal.

Both the bag according to US2019/0269268A1 and the sheet described in WO2008/043955A2 are solutions capable of detecting tears by activating an alarm signal, generally a sound signal but not very suitable for detecting more than one tear. More particularly, the multilayer structure of WO2008/043955A2 does not guarantee an adequate adhesion between the layers and, once torn, the sheet is practically peeled, with the electrically conductive layers that risk being damaged and in contact one with the other.

In addition, both solutions are not suitable for adequately protecting containers of goods such as pellets and the like, in that formed by a single continuous layer that does not allow the insertion in its interior or the complete wrapping of a content to be transported of such dimensions.

From the foregoing, the disadvantages of the protective packagings applied to containers of goods such as pallets and the like appear clear, which are not particularly suitable for preventing and detecting break-in attempts, unauthorised access attempts, impacts and in general events potentially damaging to the goods transported. Furthermore, known systems are not capable of adequately detecting and signalling multiple break-in attempts, i.e. which occur on the same packaging during the same transport phase.

SUMMARY OF THE INVENTION

It is therefore an object of the present invention to provide a transport pallet packaging that overcomes the disadvantages of the prior art.

More particularly, an object of the present invention is to provide an alarmed packaging for containers of goods such as pallets and the like, which enables multiple break-in attempts to be detected, as well as possible damage.

Another object of the present invention is to provide packaging for pallets that allows detection of where and when such break-in attempts have occurred, also in real time, in order to identify the responsible party within the transport chain.

A further object is to provide packaging for pallets that has improved features with respect to known products, also in terms of impact and weather protection, and that allows easy application.

These and other objects are achieved by an alarmed packaging for pallets according to the invention having the features disclosed and claimed.

Advantageous embodiments of the invention are also disclosed and claimed.

Substantially, the present invention relates to a closable alarmed packaging suitable for application to a container of goods, such as pallets or the like, made in at least two sections whose edges are provided with closure elements and which, once brought into contact, completely envelop and seal the container of goods, wherein said sections are formed as multilayers comprising at least one first electrically conductive layer, a second electrically conductive layer and an electrically insulating layer placed between said two conductive layers, the electrically insulating layer having a composition such that it recovers its thickness after being crushed, wherein in addition to each of said sections a support is applied containing at least two conductive attachments, at least one of said conductive attachments being connected to a first of said conductive layers and at least one of said conductive attachments being connected to the second of said conductive layers; an electronic device provided with a low voltage source and with at least two electrodes is applied to each of said sections of the closable packaging by means of said support, at least one of said electrodes coming into contact with at least one of said conductive attachments of the support in order to create a continuous low voltage on said first electrically conductive layer of each section, and at least one of said electrodes coming into contact with at least one of said conductive attachments of the support in order to create a continuous low voltage on said second electrically conductive layer of each section; and said electronic device also functions as transmitter of a signal to a receiver and is able to record the voltage variation inside the multilayer section in response to impacts or tears of the closable packaging or to an unauthorised removal of the same device from its support, as well as to signal this event to said receiver.

BRIEF DESCRIPTION OF THE DRAWINGS

Further features of the invention will be made clearer by the following detailed description, referring to a purely illustrative, and therefore non-limiting, embodiment thereof illustrated in the accompanying drawings, wherein.

DESCRIPTION OF THE PREFERRED EMBODIMENTS

Figure 1:
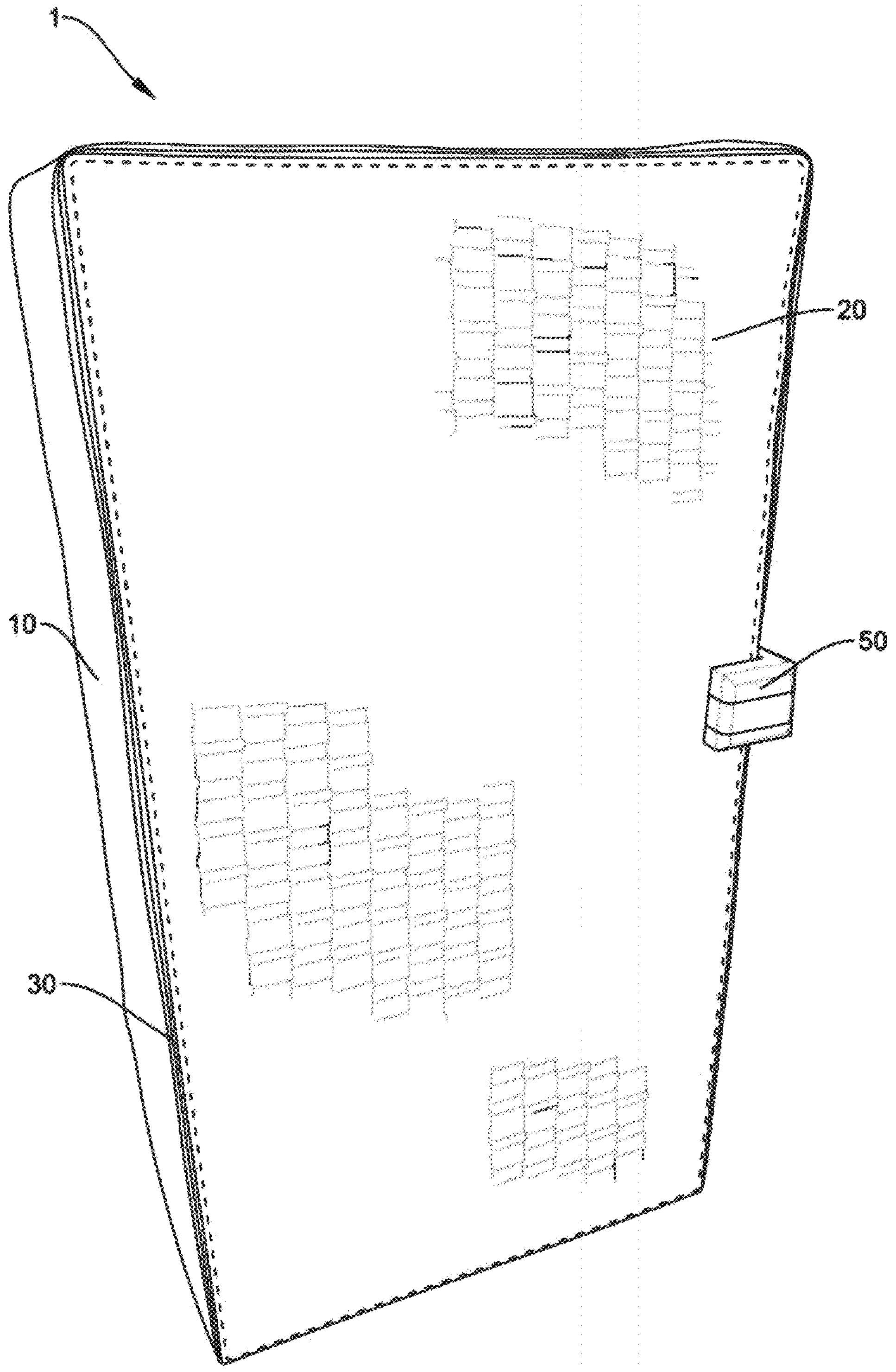
FIG. 1 is a perspective illustrative view of the closable packaging according to a preferred embodiment of the present invention formed by two different sections.

A preferred embodiment of a closable alarmed packaging according to the present invention will now be described in detail with reference to the accompanying drawings.

The peculiarity of the alarmed packaging consists in the multilayer composition of the sections that compose its surface, which have in particular at least one first electrically conductive layer and a second electrically conductive layer separated by a layer of insulating material interposed between them. More particularly, the sections can be viewed as a series of coupled plastic and metal films, wherein the conductive layers remain isolated one from the other.

Advantageously, the conductive layers are aluminium films and the non-conductive layer is a polymeric film in EPE. In a preferred embodiment, the sections are made in layers of material placed in the following order (starting from the outer surface): PET—aluminium—woven raffia—EPE—woven raffia—aluminium—PET. With such a configuration, the aluminium conductive layers remain isolated one from the other.

A further peculiarity of the packaging consists in the fact that, in use, a low voltage is constantly applied to the conductive layers. Should these layers come into contact one with the other, also by means of traversing by a lacerating object such as a blade or the like, a change in voltage occurs which is immediately recorded by an electronic device associated with the packaging.

This electronic device, which is an integral part of the alarmed packaging, also functions as a transmitter, being capable of transmitting information on the status of the various sections of the packaging to a receiving platform or generally to a user remotely connected to the device. It also contains the source designed to apply low voltage to the conductive layers by means of appropriate conductive attachments. Generally, the low voltage source is a lithium battery.

This system, once the packaging 1 has been applied to the container to be protected, makes it possible to signal in real time multiple break-in attempts or accidental damage, also repeated in time, thus making it possible to identify, also in real time, the subject of the transport chain responsible for the event. In fact, both break-in attempts due to tears and accidental events of various kinds involving particularly violent impacts cause the crushing of multilayer sections with the consequent creation of points of contact between the conductive layers. More particularly, in the case of tears in the packaging caused by an object provided with a metal blade, the blade itself will create a connection between the conductive layers, without them actually coming into contact.

The insulating material placed between the two conductive layers plays a fundamental role in the functioning of the alarmed packaging, more particularly in ensuring the possibility that further break-ins or damaging events can be traced after the first one. It is in fact preferably made from material which, after crushing, returns to its original thickness, thus avoiding that after the first break-in attempt a continuous contact remains between the two conductive layers and therefore a signal which is disturbed with respect to the standard one.

A preferred embodiment of the alarmed packaging is that shown in the various accompanying drawings. In FIG. 1 an alarmed packaging is shown, denoted overall by reference numeral 1, applied to a pallet of parallelepiped shape, to which an electronic device 50 is associated. In this embodiment, the packaging 1 is composed of two separate sections 10 and 20 which can be coupled one to the other, by means of suitable coupling and closure means, directly on the container to be protected. Generally, sections 10 and 20 have on their edges the elements of a zip or zipper 30, in such a way as to make the contents easily accessible and inspectable by an authorised user.

Although an embodiment formed by two separable sections will be described here below, the packaging can also be made in more than two different sections, joined by a zip to allow access to the container or pallet.

Figure 2:
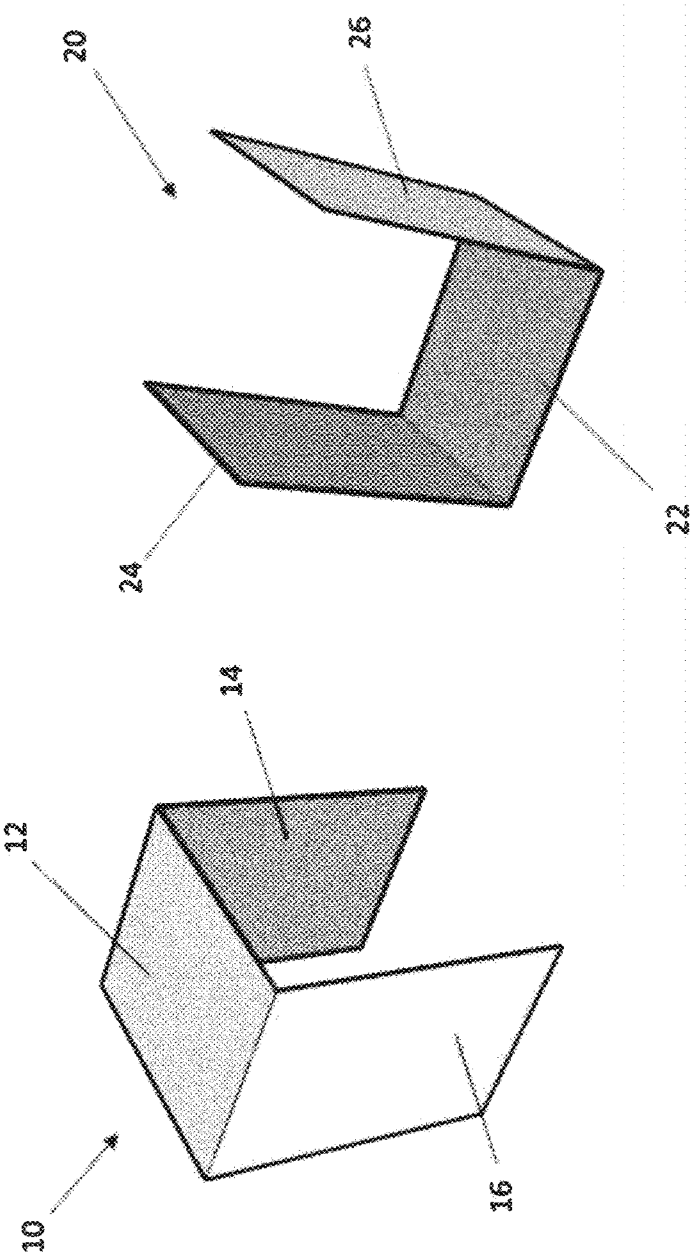
FIG. 2 is a schematic view showing separately the two sections of the closable packaging.

Conveniently, the two sections 10 and 20 present a “C” configuration like that shown schematically in FIG. 2, particularly suitable for application on a pallet of cubic or parallelepiped shape. This drawing shows a first section 10 formed by a top surface or face 12 and by two lateral faces 14, 16 placed in a substantially perpendicular manner to the top face on its two opposite edges. A second section 20 is constituted in a manner totally analogous to the first C-shaped section 10, presenting a surface defining, only by convention, a bottom face 22 and two lateral faces 24, 26.

It is in itself evident that, in such an embodiment, the top 10 and the base 20 have the same shape; in the same way, the lateral faces 14, 16 and 24, 26 also have the same shape, which may be analogous to that of base 10 and top 20 in the case of cubic packaging.

The closure of the packaging 1 therefore takes place by coupling the sections 10 and 20 by means of the aforementioned closure element or zip 30 in such a way as to form a box-shaped body, making the free edges of one section coincide with the free edges of the other. Preferably, the two zips that make up the zip fastener 30 terminate in the same point of the packaging.

A structure made in this way, in addition to the convenience of application and the ease of access to the contents inside, allows reduction to a minimum of the use of welds or seams that may place in contact layers of conductive material while keeping the number of sections of which it is composed limited.

Having to avoid that during the seaming or welding of the zip 30 along all the edges of the sections 10 and 20 the conductive layers come into contact one with the other, it is preferable to use zips that are rubberized and therefore not capable of conducting, inserting their support in the thickness of the insulating material placed at the two layers of conductive material.

The application of the electronic device 50 to the packaging 1 takes place by means of one or more supports 40, 40' applied to the sections, such as those shown in FIGS. 5 to 8. A single support 40, in addition to the mere mechanical function of coupling between electronic device 50 and packaging 1, comprises four conductive attachments 41, 42, 43, 44 for tensioning the conductive layers of the sections 10 and 20.

More particularly, after the application of the support 50 to the multilayer section, two attachments 41 and 42 are connected to a first of the two conductive layers and another two attachments 43 and 44 are connected to the second of the two conductive layers, in order to tension the respective section of the packaging. From what has just been said, it is clear that each separate section requires a respective support for tensioning.

In the preferred embodiment, two supports 40, 40' are applied to the sections 10 and 20, respectively. The parallelepiped configuration of the packaging 1 allows the two supports 40, 40' to be applied as shown more particularly in FIG. 5, i.e. in proximity of the edges of two faces perpendicular one to the other, such as faces 16 and 26 (see also the schematic illustration of FIG. 2). More specifically, the supports 40, 40' substantially consist of a plate 45 of non-conductive material which is applied on these faces 16 and 26 at the point in which the travel of the zip 30 ends. In this way, once the two sections 10 and 20 have been coupled together and the packaging 1 has been closed, the two plates are placed one perpendicular to the other and in proximity of the point of end of travel of the zip 30, in which, in the condition of packaging 1 closed, two sliders 31 and 32 are located.

Each plate 45 of the supports 40, 40' preferably has two vertical edges 46 and 48 and a lower edge 47 that define an open seat at the top. The vertical edges 46 and 48 advantageously have slide tracks, in such a way as to allow the slide insertion of an electronic device which, going to engage the conductive couplings 41, 42, 43, 44, is capable of creating the low voltage on the multilayer section, of recording the variations of the voltage signal and of transmitting the information to a receiver.

The support 40 just described represents a preferred solution from the point of view of safety and signal quality. However, in particular cases, it is possible to apply supports comprising only two attachments, each of which is capable of tensioning one of the two conductive layers.

Figure 3:
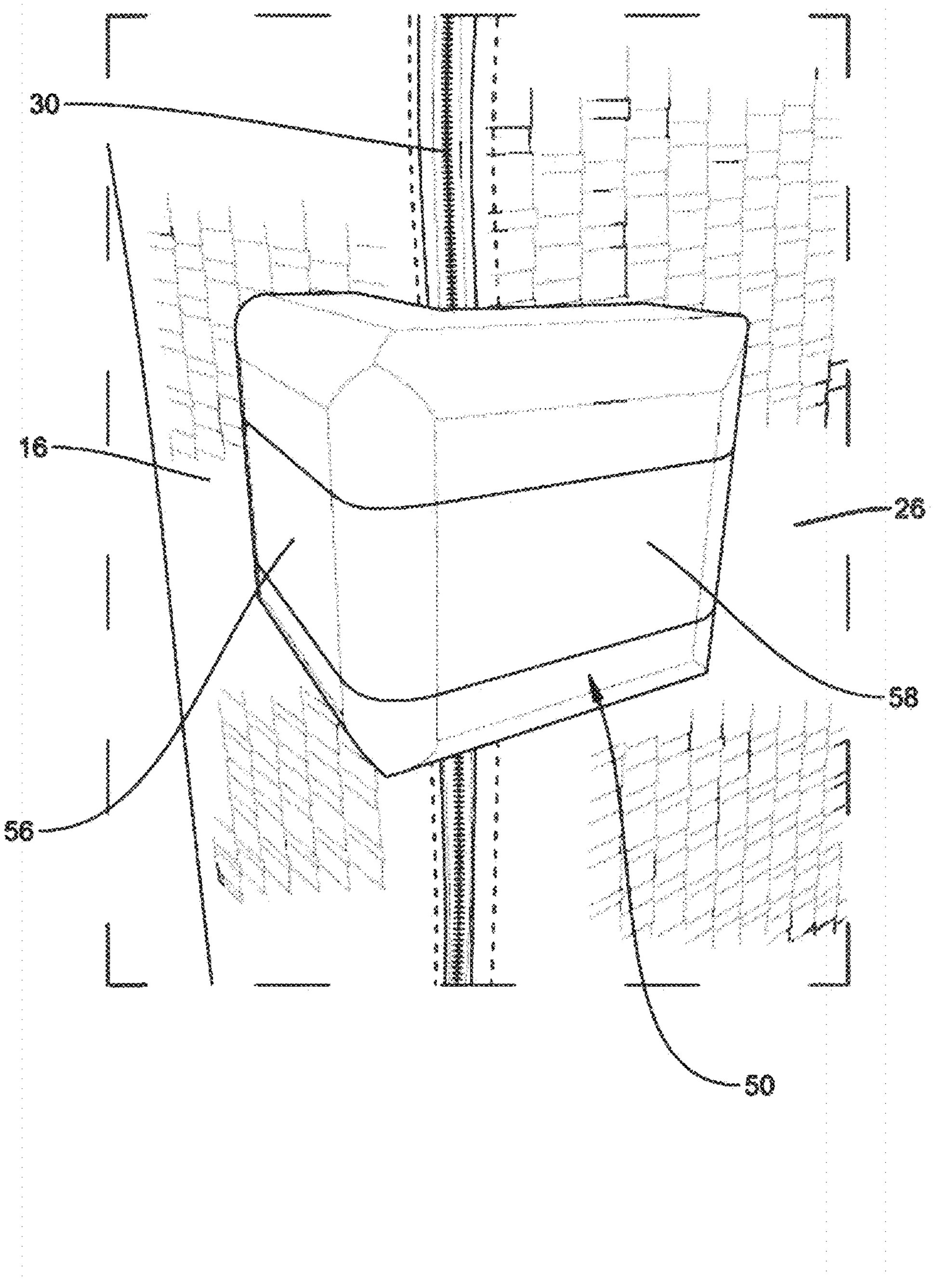
FIG. 3 is an illustrative view showing from close up an area at the edge of the closable packaging in which the electrical device is applied.
Figure 4:
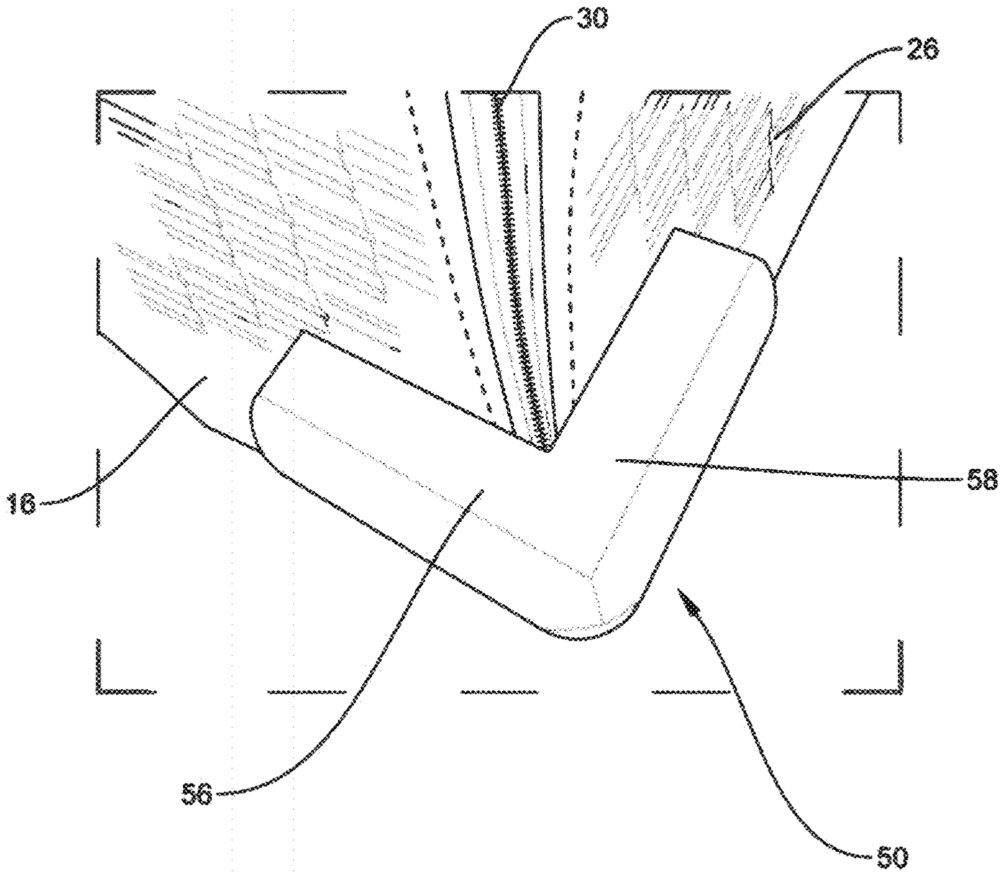
FIG. 4 is an illustrative view showing from above the electrical device when applied to the closable packaging.
Figure 5:
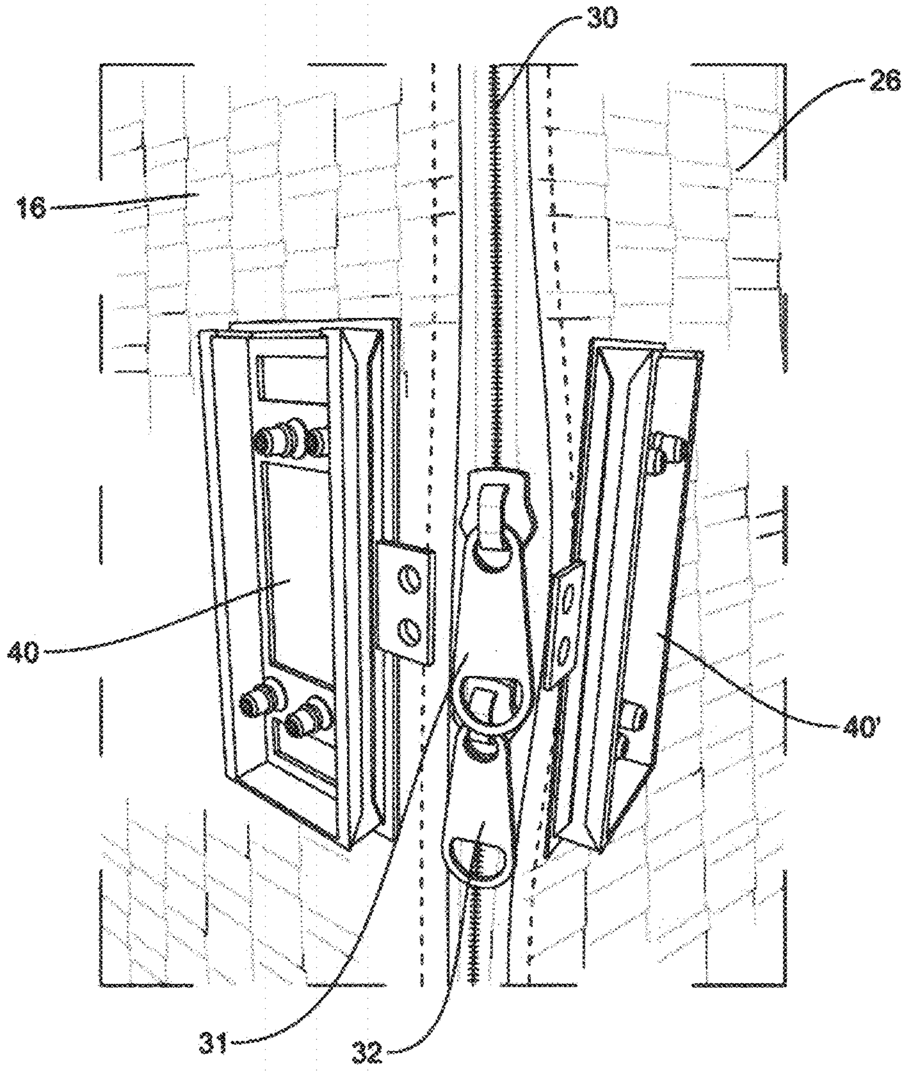
FIG. 5 is an illustrative view of the area at the edge of the packaging in which the supports for the electrical device are applied.
Figure 6:
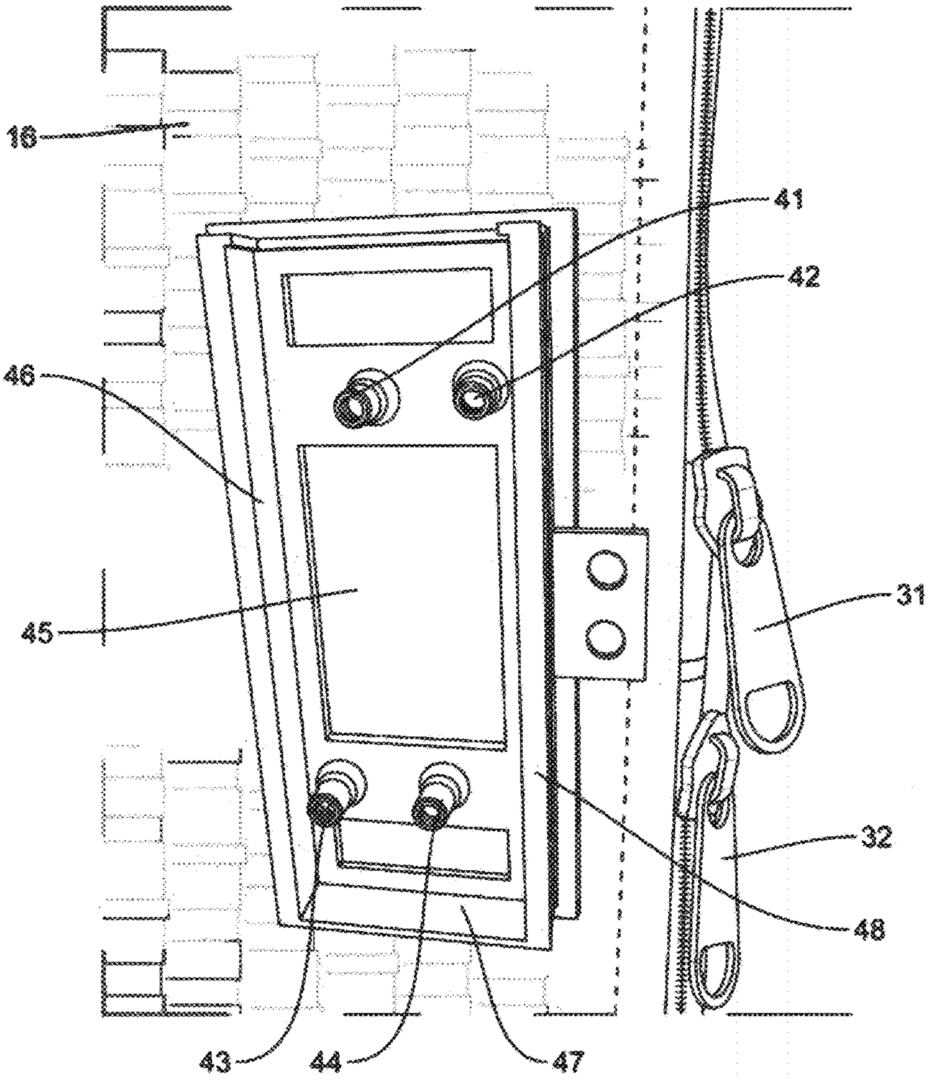
FIG. 6 is an illustrative view showing in detail a first supported mounted on a first section of the packaging.
Figure 7:
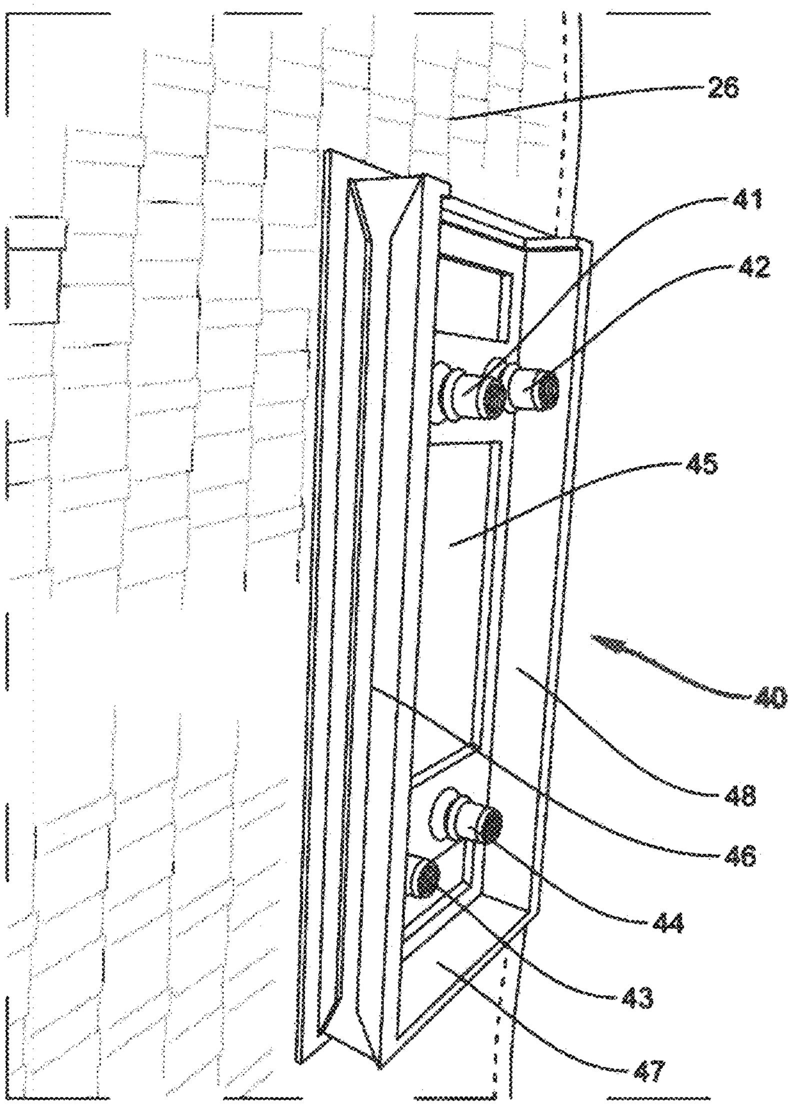
FIG. 7 is a further view of the support of FIG. 6.
Figure 8:
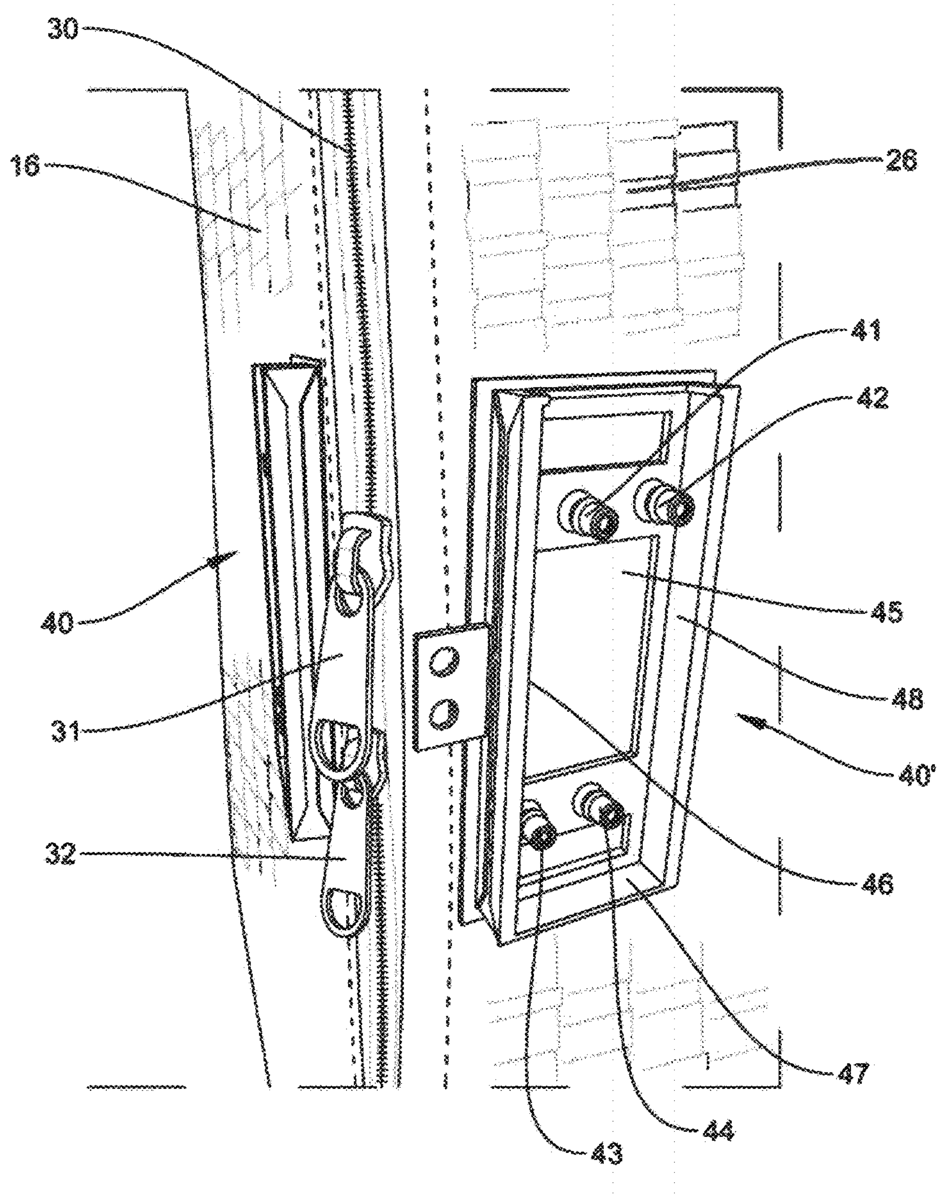
FIG. 8 is an illustrative view showing a second support mounted on a second section of the packaging.

A configuration such as that shown in the various drawings has considerable advantages from a constructional point of view, among which the possibility of applying to the packaging 1 formed by two sections 10 and 20 a single electronic device 50 of angular shape, whose appearance takes on the form shown in the frontal schematic view of FIG. 3 and in the view from above of FIG. 4. The angular electrical device 50 has such a configuration that it can simultaneously power and communicate with the two sections 10 and 20 which, being separate one from the other, would require to be powered by two respective voltage sources.

Figure 10:
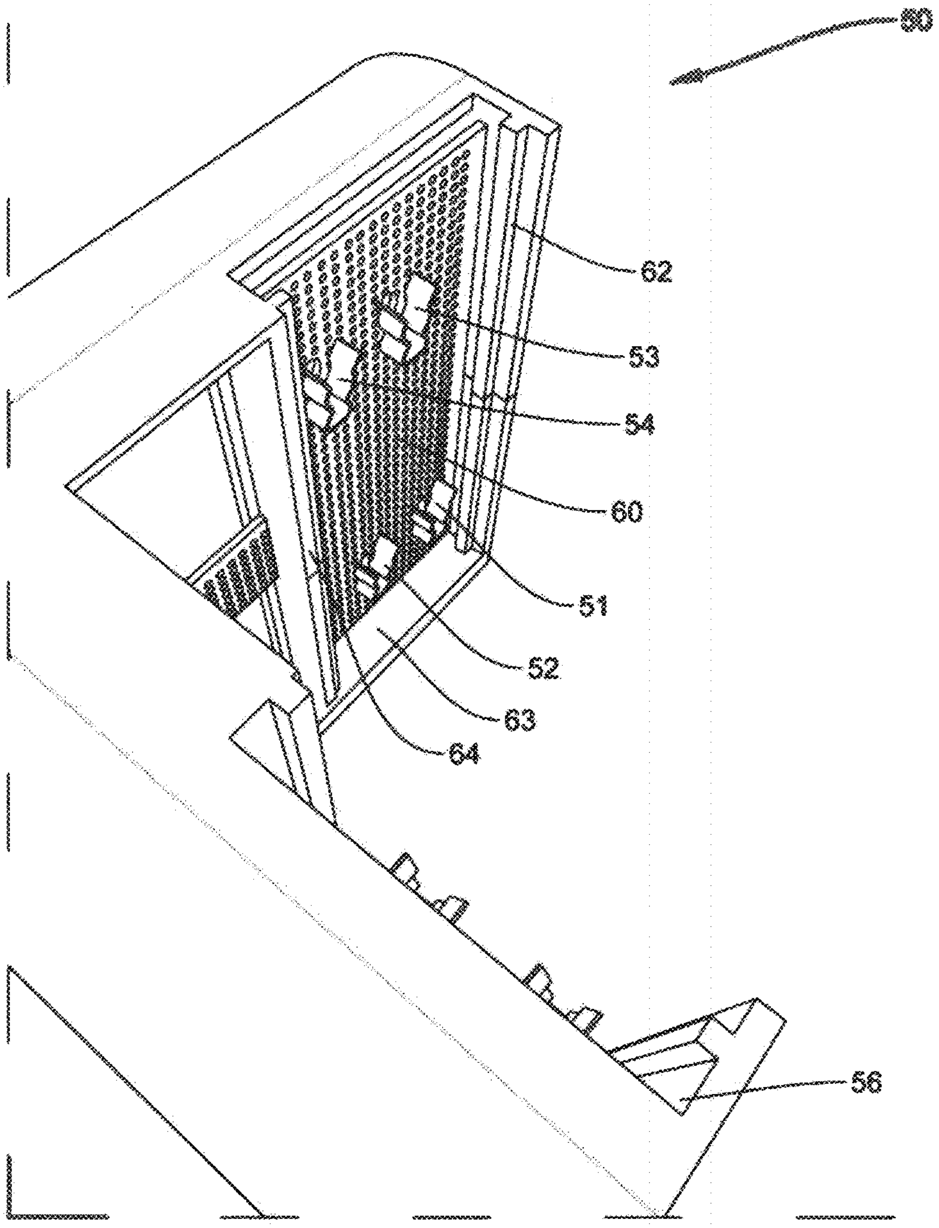
FIG. 10 is an illustrative view showing the electronic device upside down when applied to the preferred embodiment.
Figure 11:
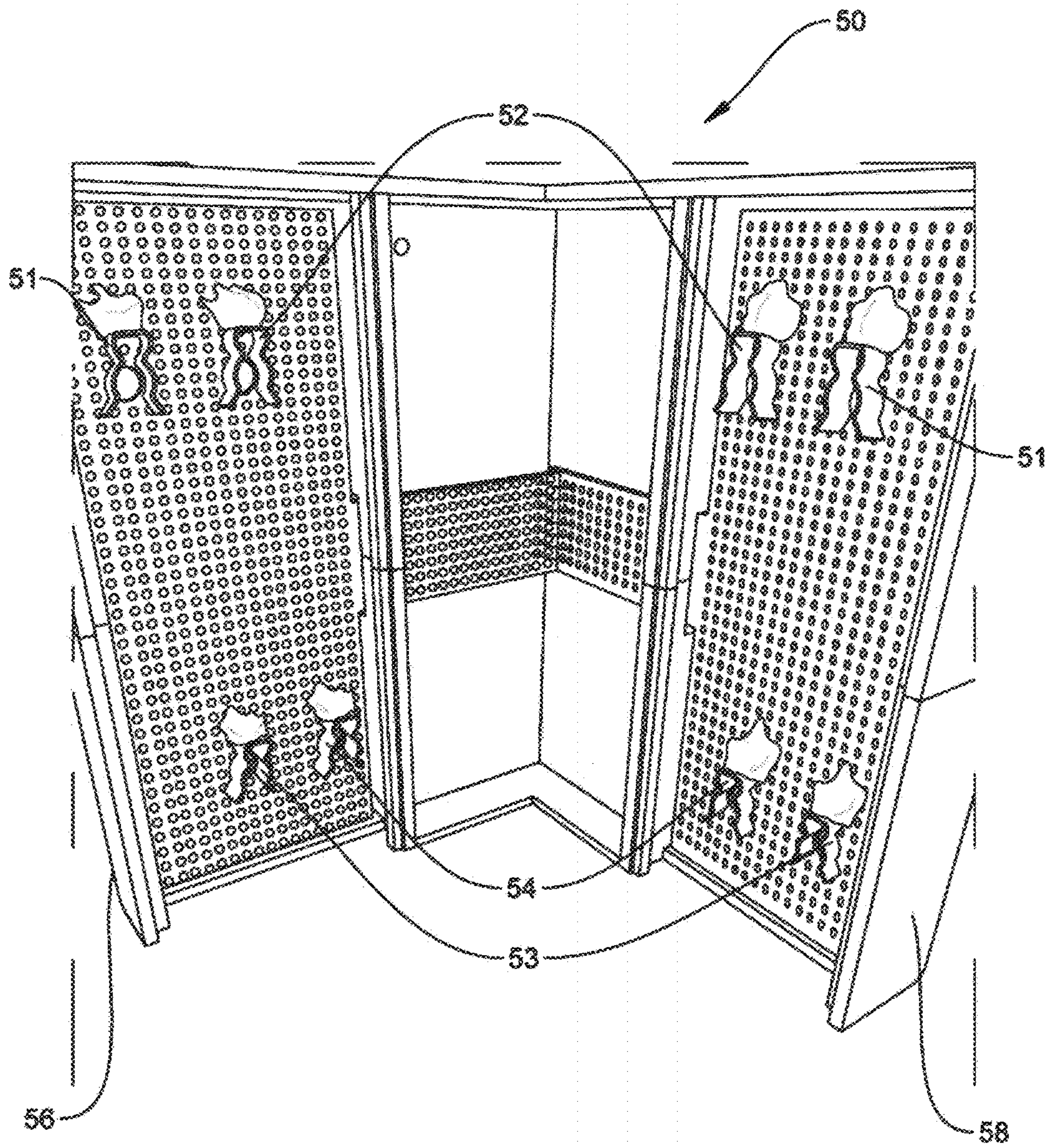
FIG. 11 is a further illustrative view showing the internal part of the electronic device.

The electronic device 50 assumes an "L" shape with a first section 56 and a second section 58 identical one to the other, whose inner part, i.e. that applied directly to the packaging 1, is better illustrated in FIGS. 10 and 11. Each of the sections 56, 58 has internally a seat 60 delimited by two vertical edges 62, 64 and by an upper edge 63. Four fixing electrodes 51, 52, 53, 54 are formed inside these seats 60, each of them being connected to the low voltage source. The electrodes are therefore apt, when the electronic device 50 is applied to the packaging, to come into contact with the conductive attachments 41, 42, 43, 44 of the supports 40, 40' in order to generate the low voltage in the multilayer sections 10 and 20.

Figure 9:
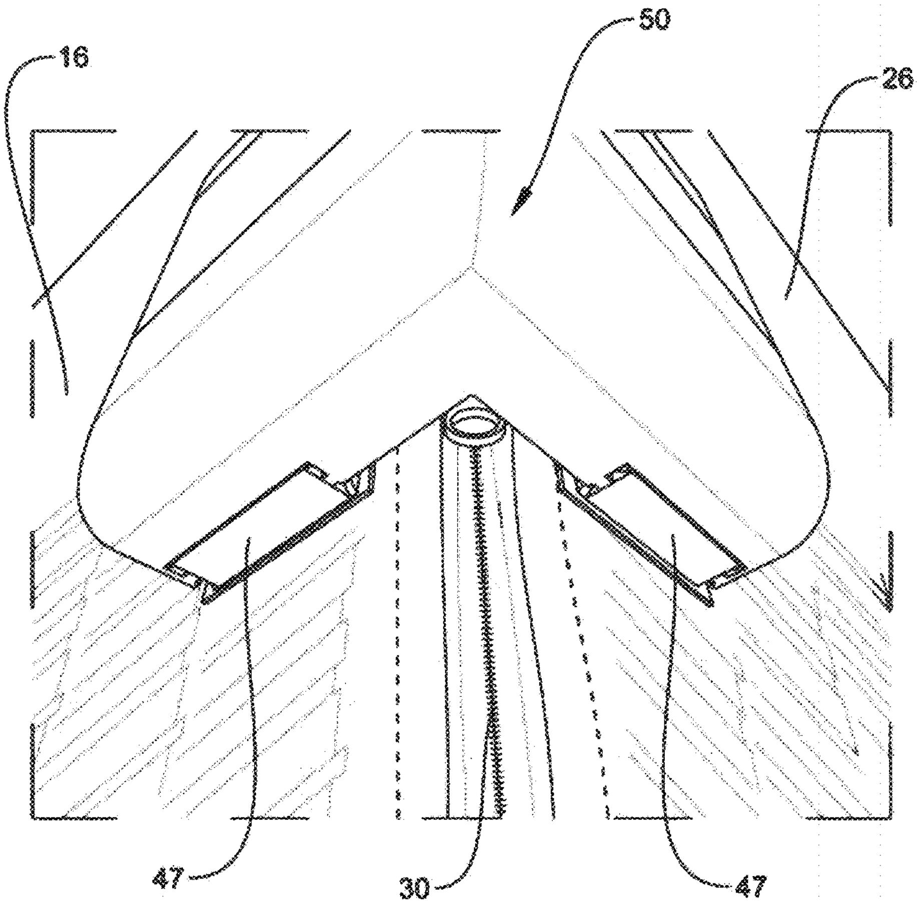
FIG. 9 is an illustrative view showing the electrical device from below when applied to the closable packaging.

The vertical edges 62 and 64 of the seat 60 have a configuration such as to allow sliding along the tracks formed on the vertical edges 46 and 48 of the supports 40, 40'. The hooking of the device 50 to the packaging 1 therefore takes place by simply slipping it from above onto the supports 40, 40'. FIG. 9 shows an illustration from below of the device 50 when it is applied to the packaging 1, with the lower edge 47 of the supports 40, 40' in evidence.

The solution adopted, whereby the fixing electrodes 51, 52, 53, 54 are the means through which the low voltage is applied to the packaging 1, also allows the device 50 to record when it has been removed from its supports, without having to apply additional sensors for this purpose, and therefore to send a signal when the operation appears to be unauthorised. Furthermore, conveniently, the electronic device 50 is applied in the point in which the travel of the zip 30 ends, with the sliders 31, 32 of the zips which are then placed in special locking housings and covered by the same device 50 once installed on the packaging 1. In such a situation, it is not possible to open the zip 30 without removing the electrical device 50; an unauthorised removal of the electrical device will therefore be immediately reported. Optionally, a numbered security seal can also be used.

Figure 12:
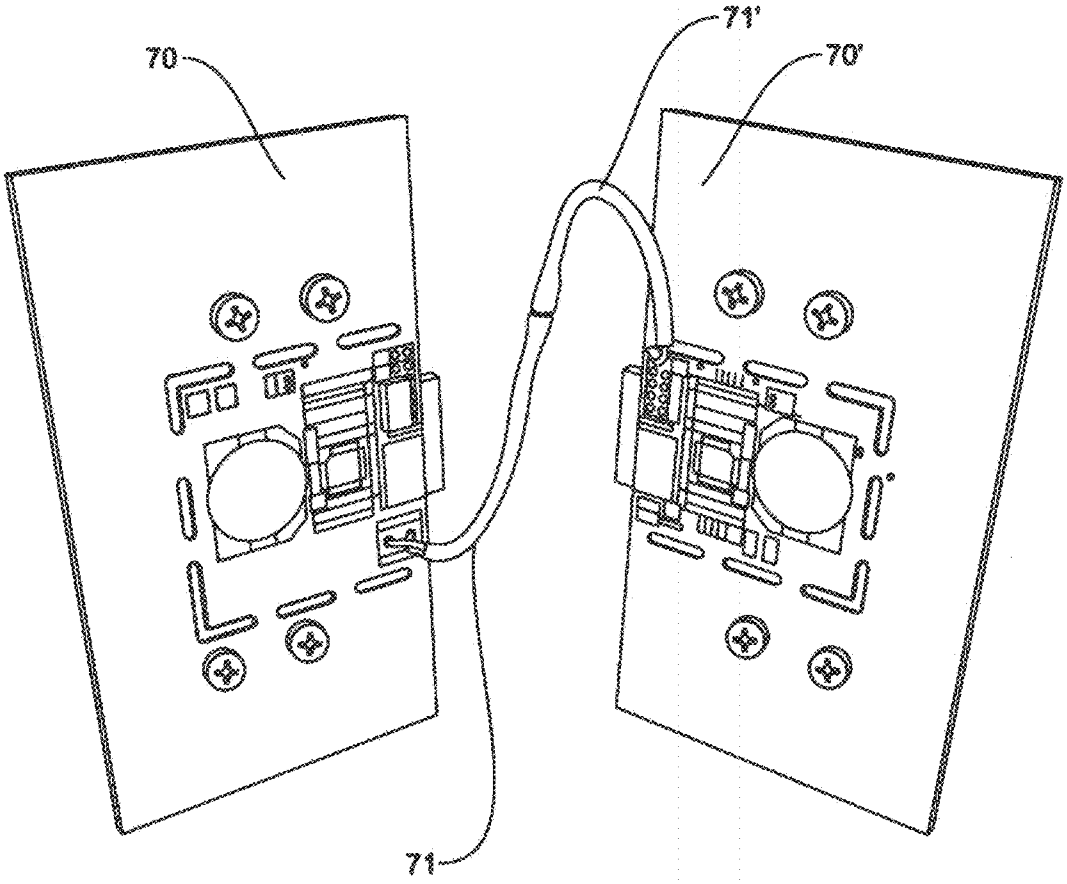
FIG. 12 is a representation of two printed circuits provided with two conductor cables connected one to the other to be inserted in the alarmed packaging for an additional level of security.

An additional level of security can be achieved through the provision of at least one printed circuit, to be inserted in a non-visible part of the packaging, independently powered and provided with a system of communication with the device 50. FIG. 12 shows a pair of printed circuits 70, 70' not yet applied to the packaging. The printed circuits 70, 70' are provided with respective conductor cables 71, 71' joined together.

Figure 13:
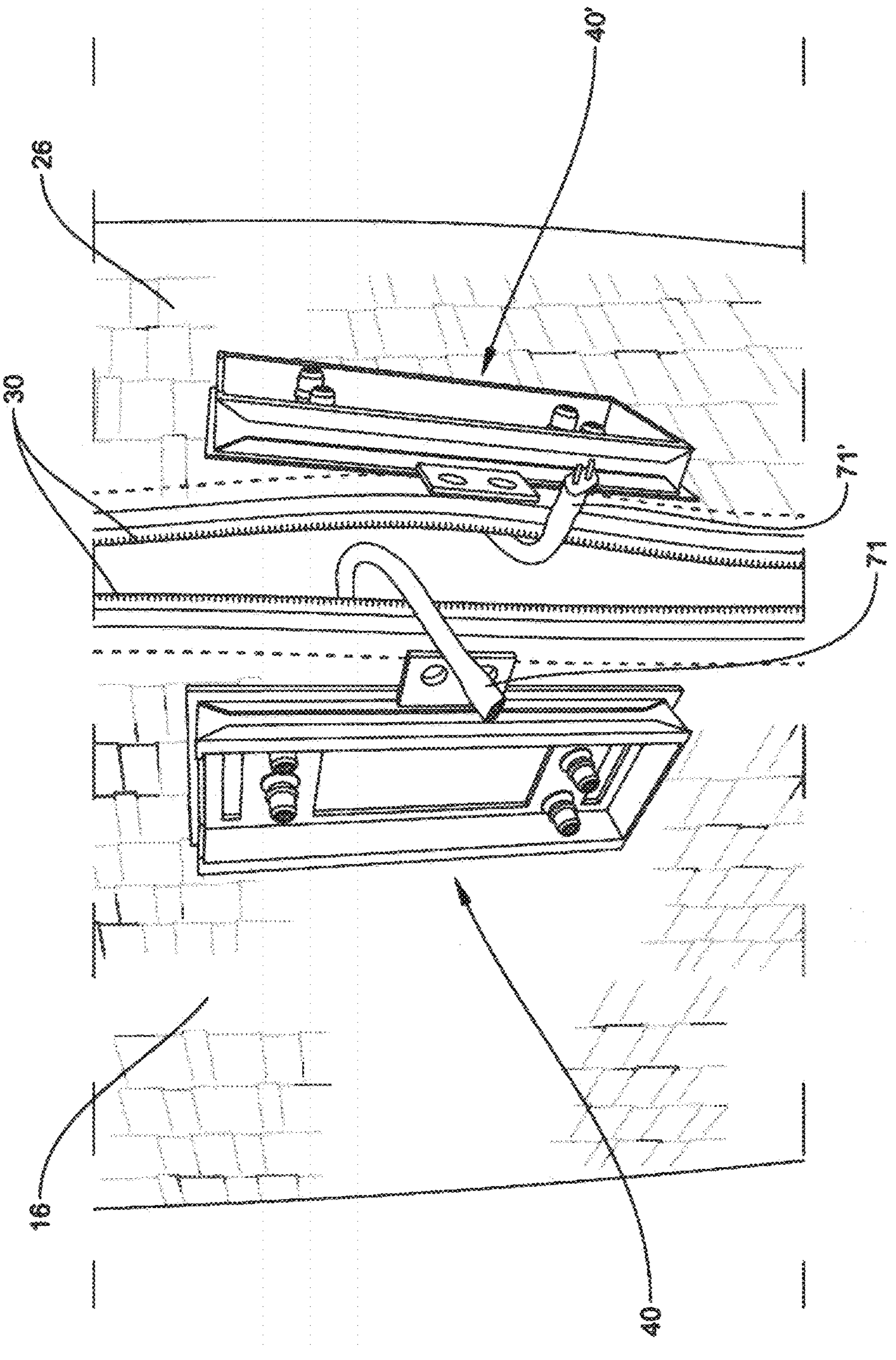
FIG. 13 is an illustrative view showing two conductor cables exiting from two printed circuits provided in the packaging.

In a preferred manner, in use, the printed circuits 70, 70' are provided at the plate 45 of the supports 40, 40', and optionally integrated therein, with the conductor cables 71, 71' protruding towards the edges of the sections of the packaging in which the closure elements are present, as shown in FIG. 13. Once the content to be transported has been placed inside the packaging and the sections have been joined together by means of the zip 30, one or more cables 71, 71' can be passed in an eyelet of the zip slider, so as to ensure a further level of control.

Figure 14:
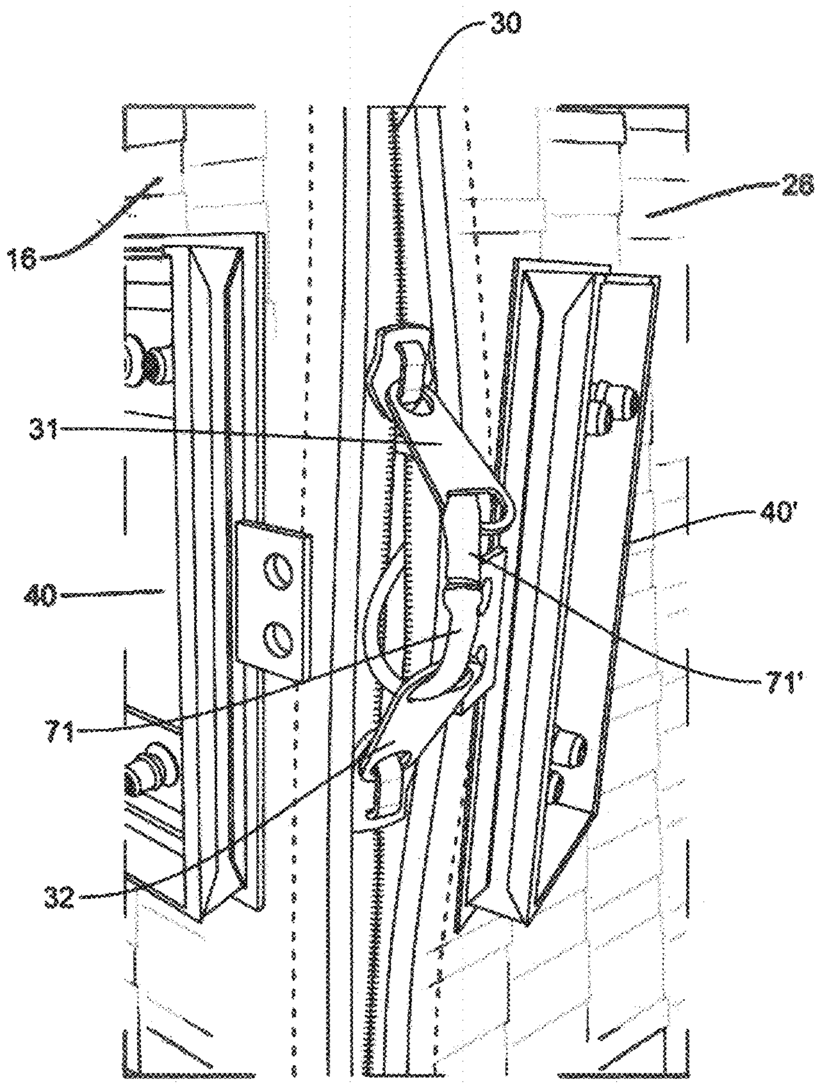
FIG. 14 is an illustrative view in which the cables exiting the printed circuits of FIG. 13 are passed through the eyelets of the sliders of a zip.

FIG. 14 shows an alarmed packaging formed by two sections and provided with two printed circuits placed at plates 40, 40' from which two connecting cables 71, 71' protrude. In this drawing, the cable 71 is passed in the eyelet of a slider 32 and the cable 71' in the eyelet of the other slider 31, establishing an electrical continuity. The zip 30 cannot therefore be opened without the cables being disconnected. Should this operation not be authorised, the interruption of the connection will be promptly signalled to the electronic device.

A similar level of safety can be obtained also by providing a single cable 71 exiting from a circuit 70, passed through the eyelet of both sliders and inserted in a plug provided in the other circuit 70', ensuring continuity of the connection until the sliders are moved.

Alternatively, it is also possible to provide only one printed circuit 70 whose cable 71, after being passed through the eyelets of the cursors 31 and 32, will go to be inserted in a plug provided in the same printed circuit 70.

In all three ways described, the cables 71, 71' passed through the eyelets of the sliders 31, 32 ensure that the packaging cannot be opened without interrupting the electrical continuity with the electronic device, which will receive an alarm in the case of unauthorised opening.

To recapitulate, an alarmed packaging according to the present invention is formed by one or more multilayer sections comprising two conductive layers separated one from the other, directly connected to an electronic device that applies a low voltage and detects variations thereof. The electronic device is preferably provided with a GSM transmitter for communicating variations in the voltage signal (and therefore probable damage to the packaging) to a data collection platform, which is capable of acquiring in real time other information such as the time and precise location in which the damage takes place thanks to the use of a GPS system. The signalling of attempts at break-ins and/or damage can take place multiple times, in that the interposed insulating layer, following a first crushing, regains its thickness, maintaining the conductive layers separate, and thus returning to supplying a standard signal. If an attempt is made to access the content again, a new alarm signal will inform the user of further tears in the packaging.

This aspect constitutes a great advantage for the user, who will also be able to identify more easily the damaged part of the packaging by means of a function in the electronic device that makes it possible to distinguish in which point of the sections the alarm was triggered, making it easier and quicker to detect the affected part by visual inspection.

In addition, various security measures can be applied to each electronic device apt to prevent direct tampering, including:

already mentioned, the signalling of the unauthorised removal of the electronic device, by sending an alarm message;

anti-jammer equipment, which allows a warning message to be sent just before the use of a radio wave blocking device; the electronic device will continue in any case to record various environmental data and break-in events;

a defence system against magnets or electric shocks, comprising a special internal resistance that enables the electronic device to prevent intentional electric shock attempts aimed at destroying its CPU before a possible magnetic shielding, signalling the problem to the user in real time;

finally, in the rare case wherein the electronic device is successfully shielded, removed from its supports on the packaging and its battery pack destroyed, an emergency battery is installed directly behind the CPU that will send a final alarm signal to the platform before shutting down.

The alarmed packaging according to the present invention also allows the detecting of multiple items of information and updates on the status of the transported goods and has several advantageous applications that will be summarised here.

Signalling of Successful Engagement of the Electronic Device

Once the protective part of the packaging has been placed around the container of the goods to be transported and the electronic device is correctly applied to the respective supports, the same device will enter "transport mode" and will signal this to the user by a message confirming the successful engagement. In the absence of this message, the respective transport phase is to be considered as not started.

Real-Time Route and Default Route Setting

During land transport, the GPS will track all the roads used to arrive at the destination and it will also be possible to choose a mandatory transport route, in which stops and any unplanned route changes will be recorded and reported, in order to prevent dangerous situations for the safety of the goods. Speed can also be monitored thanks to the use of gyroscopes and accelerometers.

"Unauthorised Movement" Mode

If for some reason it is decided not to move and/or to station the packaging applied to the goods container in a precise point without having to be moved (e.g. a security area), once the "unauthorised movement" mode has been activated it will signal, after acquiring the geographical coordinates, any movement from the designated point, alerting the control user by means of real-time messaging.

Automatic Shutdown in Aircraft

Being primarily designed for transport by air, the alarmed packaging recognises the airport area by means of geographical coordinates and, at the time of start of take-off, will automatically activate the aeroplane mode, with relative activation message, in order to be able to travel in compliance with regulations.

Functioning in the Absence of a Signal

If communications to the platform are temporarily interrupted, such as for example in the case of absence of signal due to transport by sea, crossing of tunnels, underground passages, etc., the electronic device will continue to record environmental data (temperature, data from the gyroscope and altimeter, acceleration, pressure, external and internal temperature, light inside the packaging), as well as sending a complete report of the transport, including possible reports of break-in/theft attempts, once the connection is re-established.

Mechanical and Physical Features

The alarmed packaging according to the invention is also set up to signal by means of alarm messages in real time the maximum/minimum attainment of certain settable parameters such as internal and external temperature and gyroscopic speed.

The special plastic and metal multilayer of the packaging 1 has been tested (ASTM E903-12 & ASTM C518-17) with measurement of the following parameters:

solar reflectance of 92.29%, thermal conductivity of 0.029 W/(m*K) and of thermal resistance of 0.352 $(m^2*K)/W$.

The robust and flexible multilayer composition has excellent mechanical tensile strength and impact resistance.

With reference to the particular embodiment illustrated in the drawings, the two C-shaped sections 10, 20 and the applied rubberized zips 30 make the alarmed packaging 1 liquid infiltration proof, as well as making the assembly operation simple and fast.

A smart packaging suitable for being applied on containers of goods and the like has just been described, which packaging is capable of sending alarm signals whenever it undergoes a potentially damaging event. The invention has been illustrated with particular reference to its preferred embodiment, consisting of two C-shaped sections which can be coupled together by means of a zip fastener. However, it is clear that the invention can also be applied to packagings with sections of different shapes or in more than two sections, it being understood that these sections must have a multilayer structure and that at least one electrical device suitable for creating the low voltage and transmitting the information must be present. The illustrated embodiment, for example, has the special feature of providing a single electrical device capable of powering both sections; however, in a less convenient manner, two separate electronic devices could be applied to the two sections.

The present invention is therefore not limited to the particular embodiment previously described and illustrated in the accompanying drawings, but numerous detailed changes may be made thereto, within the reach of the person skilled in the art, without thereby departing from the scope of the invention as defined in the appended claims.

LIST OF REFERENCE NUMBERS

1: alarmed closable packaging
10: first C-shaped section
12: top of first C-shaped section
14, 16: lateral faces of the first C-shaped section
20: second C-shaped section
22: base of the second C-shaped section
24, 26: lateral faces of the second C-shaped section
30: perimeter zip fastener
31, 32: zip sliders
40: support
41, 42: attachments of the support to the first conductive layer
43, 44: attachments of the support to the second conductive layer
45: plate of the support
46, 48: vertical edges of the support
47: lower edge of the support

50: electrical device

51, 52: electrodes for the attachments of the first conductive layer

53, 54: electrodes for the attachments of the second conductive layer

56: first section of the electrical device

58: second section of the electrical device

60: seat formed in the electronic device

62, 64: vertical edges of the seat in the electronic device

63: upper edge of the seat in the electronic device

70, 70': printed circuits

71, 71': conductor cables of the printed circuit

The invention claimed is:

1. Alarmed closable packaging apt to be applied to a container of goods, made in two separate sections whose edges are provided with closure elements and which, once brought into contact, completely wrap and seal the container of goods, wherein said sections are formed as multilayers comprising at least one first electrically conductive layer, a second electrically conductive layer and an electrically insulating layer placed between said two conductive layers, said electrically insulating layer having such a composition as to recover said electrically insulating layer's thickness after having undergone crushing;

wherein:

a support is applied to each of said sections containing at least two conductive attachments, at least one of said conductive attachments being connected to a first of said conductive layers and at least one of said conductive attachments being connected to the second of said conductive layers;

one electronic device, equipped with one low voltage source and with at least four electrodes, is applied to both sections of the closable packaging by means of said supports, at least two of said electrodes coming into contact with respective ones of said conductive attachments of each support in order to create a continuous low voltage on said first electrically conductive layer of each section and at least two of said electrodes coming into contact with respective ones of said conductive attachments of each support in order to create a continuous low voltage on said second electrically conductive layer of each section;

said electronic device also acts as a transmitter of a signal to a receiver and is apt to record the change in voltage inside the multilayer section in response to impacts or tears in the closable packaging or to unauthorised removal of the same device from the device's support and to report this event to said receiver.

2. The alarmed closable packaging according to claim 1, wherein said closure elements are represented by a zip attached to the edges of said sections provided with one or two sliders.

3. The alarmed closable packaging according to claim 1, wherein said low voltage source of said electrical device is an electrical battery.

4. The alarmed closable packaging according to claim 1, wherein each of said multilayer sections is made with materials placed in the following order, starting from an outermost layer: PET—aluminium—woven raffia—EPE—woven raffia—aluminium—PET.

5. The alarmed closable packaging according to claim 1, wherein said electronic device is provided with GPS system and GSM transmitter.

6. The alarmed closable packaging according to claim 1, wherein said electronic device is apt to perform at least one of the following security measures:

reporting that the electronic device has been inserted on packaging supports at the time of start of a transport phase, by sending an appropriate confirmation message to a user;

reporting of the unauthorised removal of the electronic device by sending an alarm message;

sending of a warning message when a radio wave blocking device is applied by unauthorised users;

detection by means of a resistance and real-time reporting of intentional electrical shock attempts apt to destroy its CPU in order to avoid possible magnetic shieldings;

sending of an alarm signal to the user in the case of magnetic shielding, removal of said device from the packaging and destruction of a relative voltage source by means of an emergency battery installed directly behind the CPU.

7. The alarmed closable packaging according to claim 1, comprising:

a first C-shaped section made up of a top face or surface and two lateral faces placed substantially perpendicular to said top face on the top face's two opposite edges and a second C-shaped section formed by a bottom face and two lateral faces placed substantially perpendicular to said bottom face, in such a way that, when coupled together, said sections define a parallelepiped or cube volume;

a pair of supports placed perpendicular one to the other at an edge defined by two faces belonging to different sections, each of said supports containing four conductive attachments, two of said conductive attachments being connected to the first of said conductive layers and the other two conductive attachments being connected to the second of said conductive layers;

an angular electronic device formed by a first section and a second section identical and perpendicular one to the other, whose internal part has four fixing electrodes which are apt to come into contact with the conductive attachments of one of the two supports in order to generate low voltage in the multilayer sections.

8. The alarmed closable packaging according to claim 7, wherein:

each of said supports is constituted by a plate provided with two vertical edges and with a lower edge which define a seat open above in which said conductive attachments are formed, on said vertical edges tracks being formed;

in the internal part of each of said first and second sections of the electronic device a seat is formed, delimited by two vertical edges and by an upper edge, inside whereof said fixing electrodes are formed;

said vertical edges of the electrical device having a conformation that allows the sliding along said tracks of the vertical edges of the supports, in order to allow an insertion from above downwards of the electronic device.

9. The alarmed closable packaging according to claim 7, wherein said closure element is a double slider zip having two zip sliders, and the electronic device is applied in a point in which travel of the double slider zip ends, with the zip sliders being placed in locking housings and covered by the electronic device once installed on the alarmed closable packaging.

10. The alarmed closable packaging according to claim 2, further comprising two printed circuits independently powered and in communication with the electronic device, wherein from a first one of said printed circuits a conductor cable protrudes and passes, when the packaging is closed, through an eyelet of one or both sliders of the zip and is subsequently coupled to a second one of said printed circuits, establishing a continuous electrical connection with the electronic device.

11. The alarmed closable packaging of claim 10, wherein said one or more printed circuits are provided at or integrally with said supports.

12. The alarmed closable packaging according to claim 2, wherein said low voltage source of said electrical device is an electrical battery.

13. The alarmed closable packaging according to claim 2, wherein each of said multilayer sections is made with materials placed in the following order, starting from an outermost layer: PET—aluminium—woven raffia—EPE—woven raffia—aluminium—PET.

14. The alarmed closable packaging according to claim 3, wherein each of said multilayer sections is made with materials placed in the following order, starting from an outermost layer: PET—aluminium—woven raffia—EPE—woven raffia—aluminium—PET.

15. The alarmed closable packaging according to claim 2, wherein said electronic device is provided with GPS system and GSM transmitter.

16. The alarmed closable packaging according to claim 3, wherein said electronic device is provided with GPS system and GSM transmitter.

17. The alarmed closable packaging according to claim 4, wherein said electronic device is provided with GPS system and GSM transmitter.

18. The alarmed closable packaging according to claim 2, wherein said electronic device is apt to perform at least one of the following security measures:

reporting that the electronic device has been inserted on packaging supports at the time of start of a transport phase, by sending an appropriate confirmation message to a user;

reporting of the unauthorised removal of the electronic device by sending an alarm message;

sending of a warning message when a radio wave blocking device is applied by unauthorised users;

detection by means of a resistance and real-time reporting of intentional electrical shock attempts apt to destroy its CPU in order to avoid possible magnetic shieldings;

sending of an alarm signal to the user in the case of magnetic shielding, removal of said device from the packaging and destruction of a relative voltage source by means of an emergency battery installed directly behind the CPU.

* * * * *